(12) United States Patent
Chalk et al.

(10) Patent No.: US 10,807,250 B2
(45) Date of Patent: Oct. 20, 2020

(54) METHOD AND APPARATUS FOR PROCESSING ORTHOPEDIC COMPONENTS

(71) Applicant: Biomet Manufacturing, LLC, Warsaw, IN (US)

(72) Inventors: Jacob Chalk, Warsaw, IN (US); James E. Vanderford, Columbia City, IN (US); Kevin Horvath, Plymouth, IN (US); Donald Lawson, Hebron, IN (US)

(73) Assignee: Biomet Manufacturing, LLC, Warsaw, IN (US)

( * ) Notice: Subject to any disclaimer, the term of this patent is extended or adjusted under 35 U.S.C. 154(b) by 135 days.

(21) Appl. No.: 15/479,921

(22) Filed: Apr. 5, 2017

(65) Prior Publication Data

US 2017/0291306 A1  Oct. 12, 2017

Related U.S. Application Data

(60) Provisional application No. 62/319,467, filed on Apr. 7, 2016.

(51) Int. Cl.
  B25J 15/00     (2006.01)

(52) U.S. Cl.
  CPC ................ *B25J 15/0028* (2013.01)

(58) Field of Classification Search
  CPC .. B25J 15/0028; B25J 15/0023; B25J 15/083; B25J 15/086

USPC ............... 269/95; 29/255, 261; 254/93 R
See application file for complete search history.

(56) References Cited

U.S. PATENT DOCUMENTS

| 1,890,369 | A | * | 12/1932 | Cook | ............... | B25B 27/005 |
| | | | | | | 29/246 |
| 8,800,343 | B2 | * | 8/2014 | Wettlaufer | ............ | A62B 3/005 |
| | | | | | | 72/392 |
| 2018/0021603 | A1 | * | 1/2018 | Horne | ............... | A62B 3/005 |
| | | | | | | 254/93 R |

OTHER PUBLICATIONS

Beswick, The Basic of Pressure Relief Valves, Jan. 20, 2016 http://www.beswick.com/basics-pressure-relief-valves (Year: 2016).*

* cited by examiner

*Primary Examiner* — Tyrone V Hall, Jr.
*Assistant Examiner* — Abbie E Quann
(74) *Attorney, Agent, or Firm* — Schwegman Lundberg & Woessner, P.A.

(57) ABSTRACT

A fluid powered gripper can include a body, a bore, a first finger, a second finger, and a piston. The body can include a central bore coaxial with a central longitudinal axis of the body. A bore fluid inlet can be fluidly coupleable to the central bore. The first finger can be rotatable about the body. The second finger can oppose the first finger and the second finger can be rotatable about the body. The piston can be disposed in the central bore. The piston can be powered by a fluid to move between a first position and a second position. The first finger and the second finger can be closed in the first position and open in the second position.

10 Claims, 14 Drawing Sheets

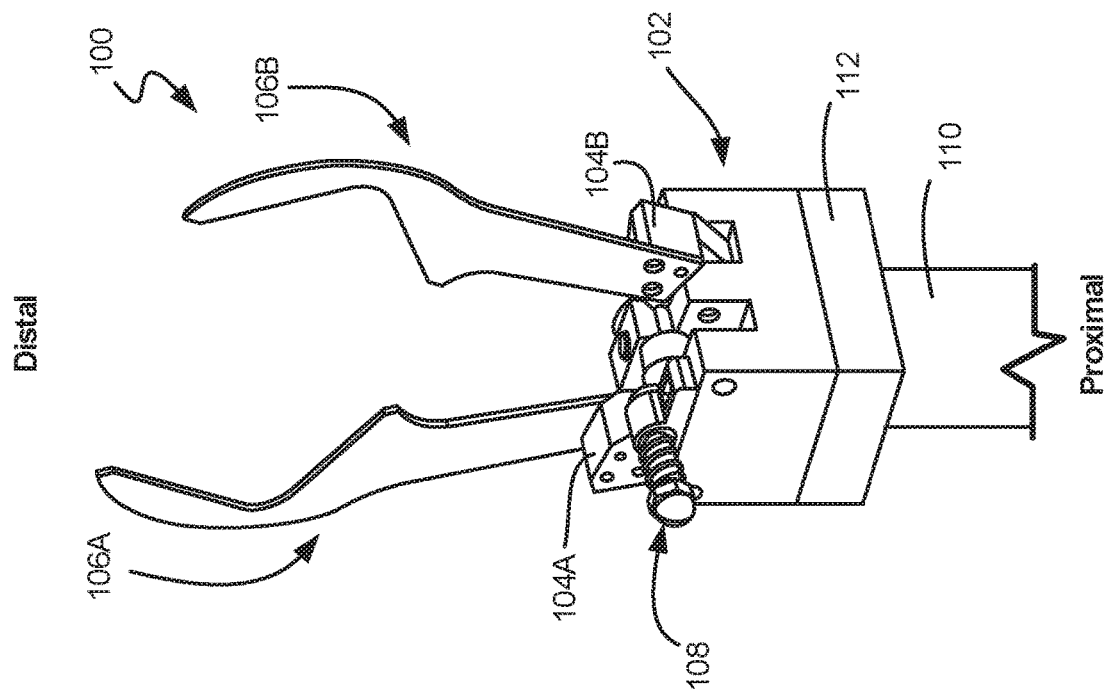
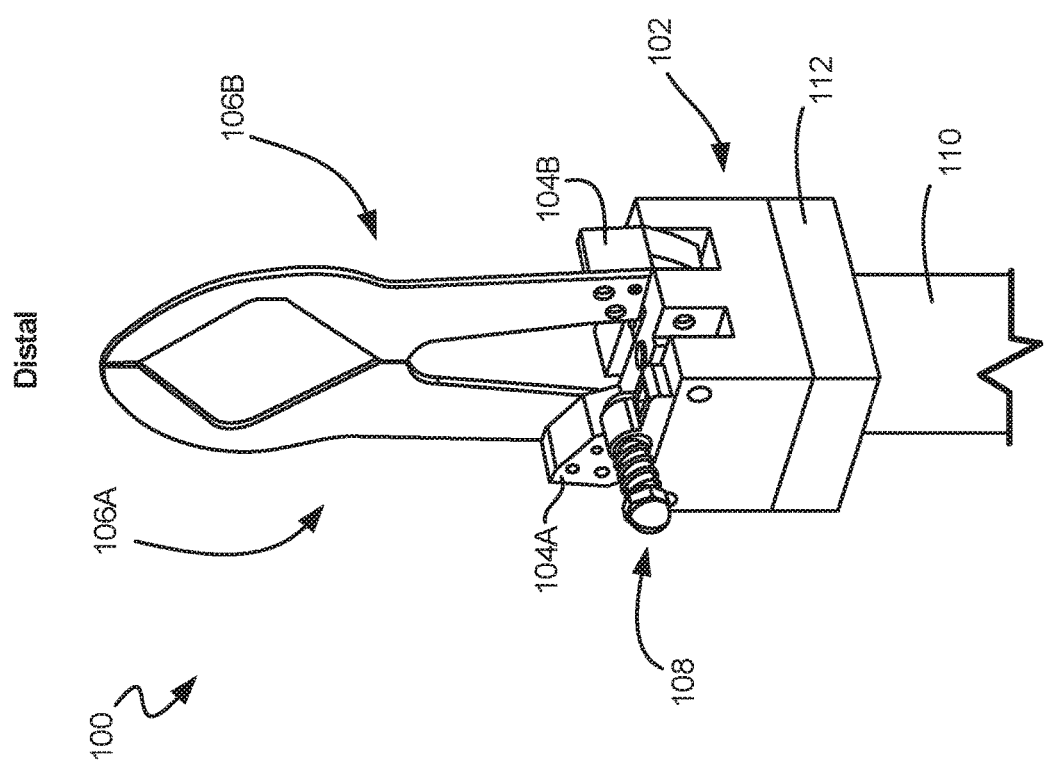

METHOD AND APPARATUS FOR PROCESSING ORTHOPEDIC COMPONENTS

CLAIM OF PRIORITY

This application claims the benefit of U.S. Provisional Patent Application Ser. No. 62/319,467, filed on Apr. 7, 2016, the benefit of priority of which is claimed hereby, and which is incorporated by reference herein in its entirety.

BACKGROUND

Computer numerical control (CNC) machines are commonly used in manufacturing to automate a variety of manufacturing processes, such as machining operations. In some machining operations, a workpiece is loaded into a CNC machine that includes a controller. The controller can receive a program instructing the machine how to perform operations on the workpiece. The machine can operate motors, such as actuators, to move tools to engage the workpiece at desired positions. Additional motors can be used to rotate the workpiece and the tool or tools.

OVERVIEW

A fluid powered gripper can include a body, a bore, a first finger, a second finger, and a piston. The body can include a central bore coaxial with a central longitudinal axis of the body. A bore fluid inlet can be fluidly coupleable to the central bore. The first finger can be rotatable about the body. The second finger can oppose the first finger and the second finger can be rotatable about the body. The piston can be disposed in the central bore. The piston can be powered by a fluid to move between a first position and a second position. The first finger and the second finger can be closed in the first position and open in the second position.

To further illustrate the apparatuses and systems disclosed herein, the following non-limiting examples are provided:

Example 1 is a fluid powered gripper comprising: a body comprising a central bore coaxial with a central longitudinal axis of the body; a bore fluid inlet fluidly coupleable to the central bore; a first finger rotatable about the body; a second finger opposing the first finger, the second finger rotatable about the body; and a piston disposed in the central bore, the piston powered by a fluid to move between a first position and a second position, wherein the first finger and the second finger are closed in the first position and open in the second position.

In Example 2, the subject matter of Example 1 optionally includes a biasing element engaging the piston and the body, the biasing element biasing the piston to the first position.

In Example 3, the subject matter of Example 2 optionally includes a first arm securable to the first finger and pivotably coupleable to the body; and a second arm securable to the second finger and pivotably coupleable to the body.

In Example 4, the subject matter of Example 3 optionally includes an actuator coupleable to a distal termination of the piston, the actuator coupleable to the first arm and the second arm, the actuator movable with the piston to actuate the first arm and the second arm between open and closed positions.

In Example 5, the subject matter of any one or more of Examples 3-4 optionally include wherein: the actuator further comprises a first notch and a second notch; the first arm further comprises a first drive pin extending from a proximal portion of the first arm to engage the first notch; and the second arm further comprises a second drive pin extending from a proximal portion of the second arm to engage the second notch.

In Example 6, the subject matter of any one or more of Examples 1-5 optionally include a plunger coupleable to the body and extending from the body transverse to the central longitudinal axis.

In Example 7, the subject matter of Example 6 optionally includes the plunger further comprising: a plunger housing coupleable to the body; a plunger shaft coupleable to the housing and extending from the body transverse to the central longitudinal axis; and a plunger biasing element engaging the plunger shaft and the plunger housing to bias the plunger shaft in an extended position.

In Example 8, the subject matter of any one or more of Examples 1-7 optionally include a tool holder comprising: a tool holder body; a tool central bore configured to receive a proximal portion of the fluid powered gripper therein, the tool central bore coaxial with and fluidly coupleable to the central bore of the fluid powered gripper; a tool holder fluid inlet proximate a proximal portion of the tool holder and fluidly coupleable to the tool central bore; and a fluid relief port fluidly coupleable to the tool central bore.

In Example 9, the subject matter of Example 8 optionally includes wherein the fluid relief port is threaded to receive a set screw, the set screw including a set screw bore configured to relieve a desired fluid flow rate to control a pressure applied to the piston when the tool holder fluid inlet receives the fluid.

Example 10 is a gripper system comprising: a fluid powered gripper comprising: a body comprising a central bore coaxial with a central longitudinal axis of the body; a bore fluid inlet fluidly coupleable to the central bore; a first finger rotatable about the body; a second finger opposing the first finger, the second finger rotatable about the body; and a piston disposed in the central bore, the piston powered by a fluid to move between a first position and a second position, wherein the first finger and the second finger are closed in the first position and open in the second position; a tool holder comprising: a tool holder body; a tool central bore configured to receive a proximal portion of the fluid powered gripper therein, the tool central bore coaxial with and fluidly coupleable to the central bore of the fluid powered gripper; a tool holder fluid inlet proximate a proximal portion of the tool holder and fluidly coupleable to the tool central bore; and a fluid relief port fluidly coupleable to the tool central bore; a fluid pump configured to deliver a pressurized fluid to the tool holder fluid inlet; and a controller in communication with the fluid pump, the controller configured to start the fluid pump to deliver pressurized fluid to the tool holder and the piston to move the first finger and second finger to an open position, and configured to stop the pump.

In Example 11, the subject matter of Example 10 optionally includes a gripper arm coupleable to the gripper; and a gripper motor operable to articulate the gripper arm.

In Example 12, the subject matter of any one or more of Examples 10-11 optionally include a machine configured to perform an operation on a workpiece, the machine comprising: a chuck movable between an open and a closed position.

In Example 13, the subject matter of Example 12 optionally includes wherein the machine is a mill-turn.

In Example 14, the subject matter of any one or more of Examples 10-13 optionally include the fluid powered gripper further comprising: a biasing element engaging the piston and the body, the biasing element biasing the piston to the first position.

In Example 15, the subject matter of any one or more of Examples 10-14 optionally include the fluid powered gripper further comprising: a first arm securable to the first finger and pivotably coupleable to the body; a second arm securable to the second finger and pivotably coupleable to the body; and an actuator coupleable to a distal termination of the piston, the actuator coupleable to the first arm and the second arm, the actuator movable with the piston to actuate the first arm and the second arm between open and closed positions.

In Example 16, the subject matter of any one or more of Examples 10-15 optionally include wherein: the actuator further comprises a first notch and a second notch; the first arm further comprises a first drive pin extending from a proximal portion of the first arm to engage the first notch; and the second arm further comprises a second drive pin extending from a proximal portion of the second arm to engage the second notch.

In Example 17, the subject matter of any one or more of Examples 10-16 optionally include the plunger further comprising: a plunger housing coupleable to the body; a plunger shaft coupleable to the housing and extending from the body transverse to the central longitudinal axis; and a plunger biasing element engaging the plunger shaft and the plunger housing to bias the plunger shaft in an extended position.

Example 18 is a method of adjusting a workpiece, the method comprising: pumping a fluid to a fluid powered gripper to open a first finger and a second finger of the gripper; opening a chuck to release a workpiece; operating a gripper motor to position the fluid powered gripper near a workpiece; reducing pressure of the fluid to close the first finger and the second finger to grasp the workpiece; operating the gripper motor to remove the workpiece from the chuck, flip the workpiece, and reinsert the workpiece into the chuck; closing the chuck to secure the workpiece; and pumping a fluid to a fluid powered gripper to open the first finger and the second finger of the gripper to release the workpiece.

In Example 19, the subject matter of Example 18 optionally includes operating the gripper motor to position a plunger coupleable to the fluid powered gripper to apply a pressure to the workpiece; and reducing pressure of the fluid to close the first finger and the second finger.

In Example 20, the subject matter of Example 19 optionally includes closing the chuck to secure the workpiece to the chuck after the plunger positions the workpiece in the chuck; and operating the gripper motor to move the gripper clear of the workpiece.

In Example 21, the fluid powered gripper, assembly, or method of any one of or any combination of Examples 1-20 is optionally configured such that all elements or options recited are available to use or select from.

These and other examples and features of the present apparatuses and systems will be set forth in part in the following Detailed Description. This Overview is intended to provide non-limiting examples of the present subject matter and it is not intended to provide an exclusive or exhaustive explanation. The Detailed Description below is included to provide further information about the present apparatuses and methods.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various examples discussed in the present document.

FIG. 1A illustrates an isometric view of a fluid powered gripper, in accordance with at least one example of the present disclosure.

FIG. 1B illustrates an isometric view of a fluid powered gripper, in accordance with at least one example of the present disclosure.

DETAILED DESCRIPTION

Figure 2:
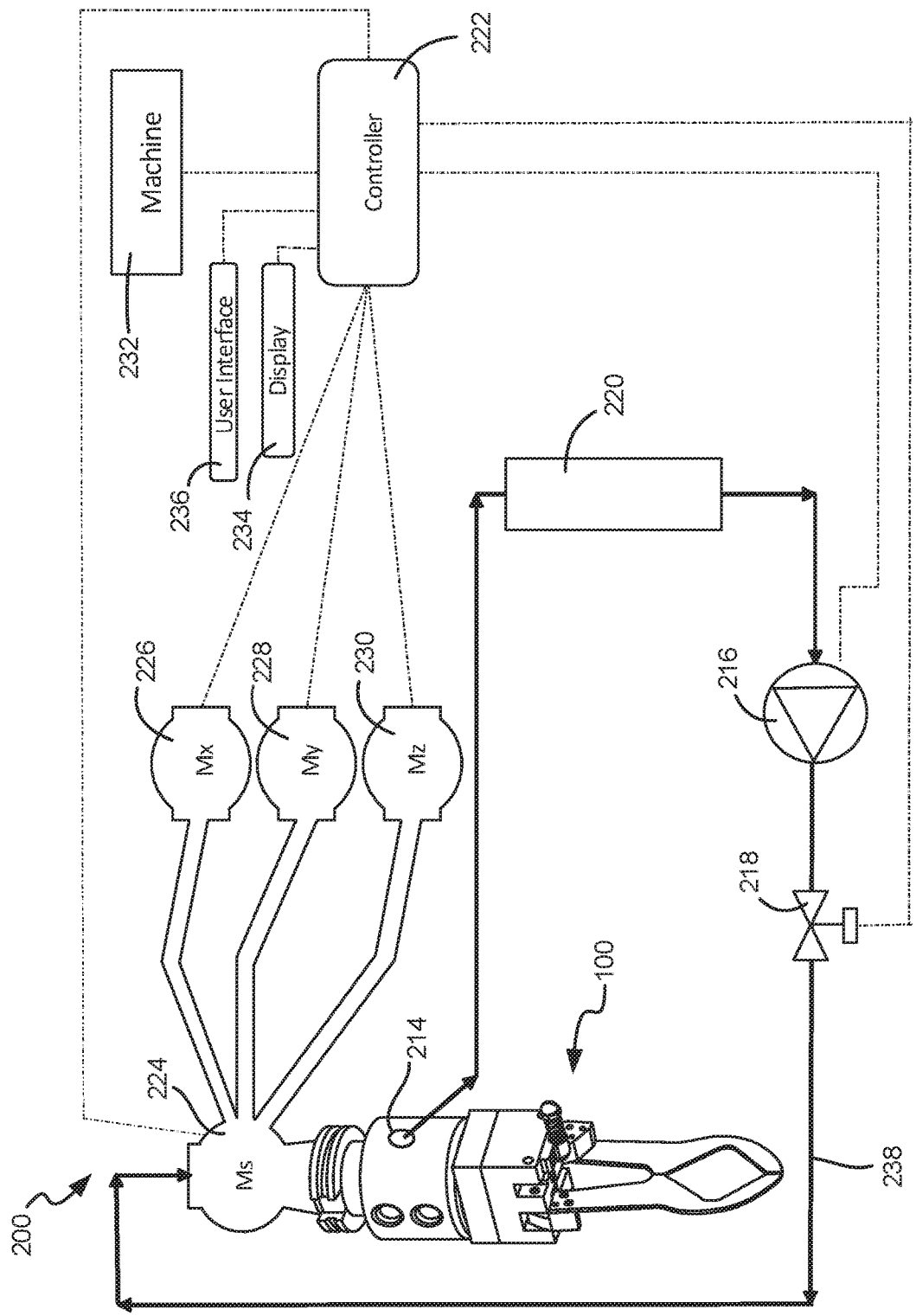
FIG. 2 illustrates a schematic view of a gripper system, in accordance with at least one example of the present disclosure.

The present disclosure relates to some machining operations. In some operations that include lathes, mills, or mill/turns, a chuck applies a clamping force to one side of the workpiece, leaving the other side available for operations such as drilling, facing, and cutting. Some components require machining operations to be performed on both ends of a workpiece. Because a chuck secures one end of the workpiece, the workpiece must be flipped at some point of the machining process. Typically, this operation must be performed by a human operator who grasps, removes, flips, and reinserts the workpiece while the CNC machine is stopped. This human interaction can slow the machining process and can increase the cost of the machined product by increasing labor costs. The inventors have recognized, among other things, that a fluid powered gripper can be used to perform a flipping operation on the workpiece, which can save time and cost.

FIG. 1A illustrates an isometric view of fluid powered gripper 100 in a closed position, in accordance with at least one example of the present disclosure. FIG. 1B illustrates an isometric view of fluid powered gripper 100 in an open position, in accordance with at least one example of the present disclosure. FIGS. 1A and 1B are discussed concurrently below.

Fluid powered gripper (gripper) 100 can include gripper body 102, first arm 104A, second arm 104B, first finger 106A, second finger 106B, and plunger 108. Gripper body 102 can include proximal portion 110 and distal portion 112. Also shown in FIGS. 1A and 1B are orientation indicators Proximal and Distal.

Gripper body 102 can be a valve body configured to support the components of gripper 100. Gripper body can be comprised of a rigid material, such as metals, plastics, and combinations thereof. Proximal portion 110 can be a substantially cylindrical portion that is configured to engage with a tool holder, as described further below. Proximal portion 110 can include a bore configured to support moving components therein, as also described further below. Distal portion 112 can have a substantially rectangular prismatic geometric shape and can be coupled to a distal end of proximal portion 110 at a proximal end of distal portion 112. Distal portion 112 can also include a bore to support moving components therein and can further include external provisions configured to secure arms 104A and 104B thereto.

First arm 104A and second arm 104B can be rigid members comprised of materials such as plastics, metals, and combinations thereof. First arm 104A and second arm 104B can be individually pivotably coupled to gripper body 102. In some other examples, first arm 104A and second arm 104B can be pivotably coupled together. First finger 106A and second finger 106B can be rigid members comprised of materials such as plastics, metals, and combinations thereof. First finger 106A and second finger 106B can be secured to first arm 104A and second arm 104B, respectively, such that first finger 106A and second finger 106B are pivotably about body 102 with arms 104A and 104B, respectively.

Plunger 108 can be comprised of a bracket, biasing element, and a shaft, as described further below. Plunger 108 can be coupled to a distal end of distal portion 112 of gripper body 102.

FIG. 2 illustrates a schematic view of gripper system 200, in accordance with at least one example of the present disclosure. Gripper system 200 can include gripper 100, tool holder 214, pump 216, pressure regulator 218, tank 220, controller 222, spindle motor 224, x-axis motor 226, y-axis motor 228, z-axis motor 230, machine 232, display 234, user interface 236, and fluid lines 238.

Gripper 100 can be the same as gripper 100 but disclosed with reference to a system with respect to FIG. 2. Tool holder 214 can be a rigid member comprised of materials such as metals, plastics, and combinations thereof. Tool holder 214 can be configured to couple to gripper 100, as described further below. Tool holder 214 can also be physically coupled to spindle motor 214, x-axis motor 226, y-axis motor 228, and z-axis motor 230. A fluid inlet of tool holder 214 can be fluidly coupled to pressure regulator 218 via fluid lines 238 and a fluid outlet of tool holder 214 can be fluidly coupled to an inlet of tank 220 via fluid lines 238, in some examples.

Pump 216 can be a pump, such as rotary or piston type pump. In one example, pump 216 can be a centrifugal pump configured to pump a hydraulic fluid (such as water, coolant, or oil). In some other examples, pump 216 can be configured to pump a compressible fluid, such as air. Pump 216 can be configured to pressurize a fluid so that the fluid flows through fluid lines 238. Pressure regulator 218 can be coupled to a downstream side of pump 216 via fluid lines 238 and tank 220 can be coupled to an upstream side of pump 216 via fluid lines 238.

Pressure regulator 218 can be a device configured to control a discharge fluid pressure from pump 216. In some examples, pressure regulator can be electrically connected to controller 222 (as shown in FIG. 2) for electrical control of pressure regulator 218 by controller 222, and pressure regulator 218 can be manually adjustable in other examples. Tank 220 can be a storage tank in some examples, configured to store additional fluid. In some other examples, tank 220 can be an expansion tank. Fluid lines 238 can be fluid lines such as rigid or flexible tubes comprised of copper, steel, plastics, and the like, configured to transmit fluid between the fluid handling components of gripper system 200. In some examples, fluid lines 238 can form a closed fluid system and in some other examples, fluid lines 238 can form an open system.

Controller 222 can be any computing device, such as a handheld computer, for example, a smart phone, a tablet, a laptop, a desktop computer, or any other computing device including a processor and wired or wireless communication capabilities. User interface 236 can be any display and/or input device. For example, user interface can be a monitor, keyboard, and mouse in one example. In other examples, user interface 236 can be a touch screen display. In yet another example, user interface 236 can provide only a display for controller 222. Controller 222 can also be coupled to display 234, which can be a monitor or other device capable of displaying information. In some examples, user interface 236 can include a display.

Controller 222 and user interface 222 can include machine readable medium. The terms "machine readable medium" may include any medium that is capable of storing, encoding, or carrying instructions for execution by the device and that cause the device to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

Machine 232 can be a machine capable of performing CNC operations, such as a lathe, mill, or mill-turn, in some examples. Machine 232 can be in electrical communication with controller 222, which can control operations of machine 232.

Spindle motor 224, x-axis motor 226, y-axis motor 228, and z-axis motor 230 can be motors or actuators in communication with controller 222. In some examples, each of spindle motor 224, x-axis motor 226, y-axis motor 228, and z-axis motor 230 can be a servo motor configured to precisely control linear movement of tool holder 214. Spindle motor 224, x-axis motor 226, y-axis motor 228, and z-axis motor 230 can be coupled to tool holder 214 and configured to move tool holder 214 relative to machine 232

Figure 3:
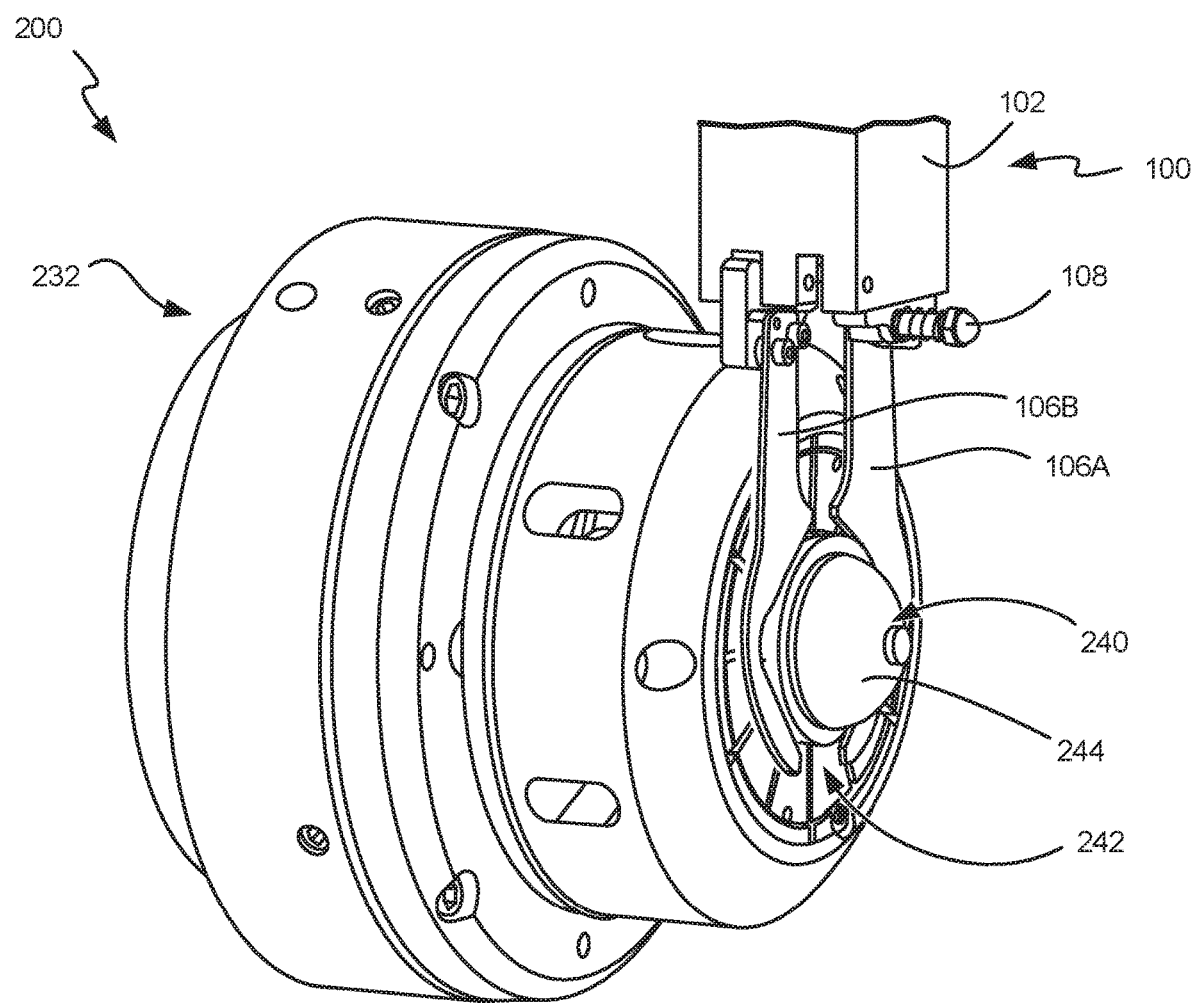
FIG. 3 illustrates an isometric view of a portion of a gripper system in a first condition, in accordance with at least one example of the present disclosure.
Figure 4:
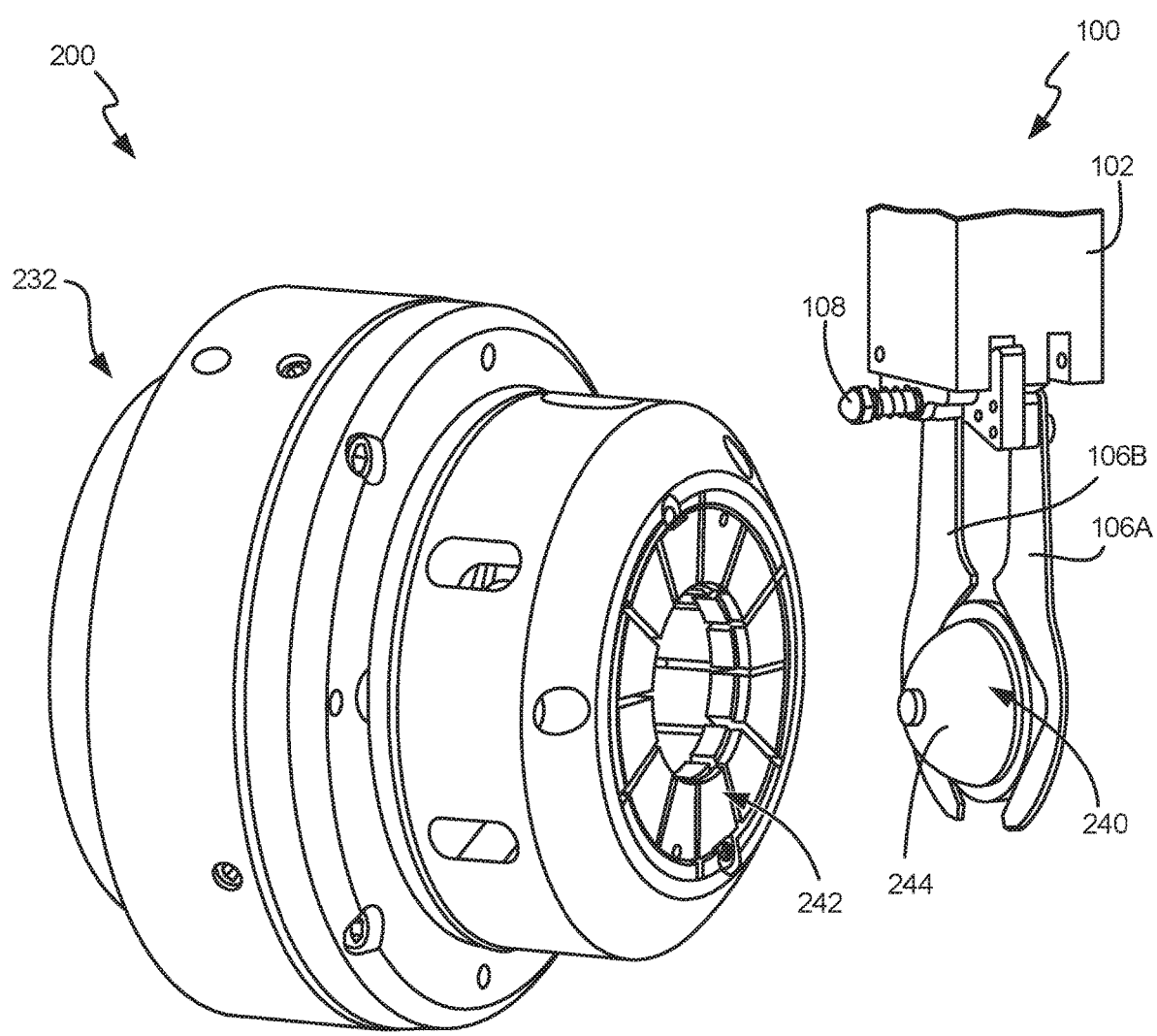
FIG. 4 illustrates an isometric view of a portion of a gripper system in a second condition, in accordance with at least one example of the present disclosure.
Figure 5:
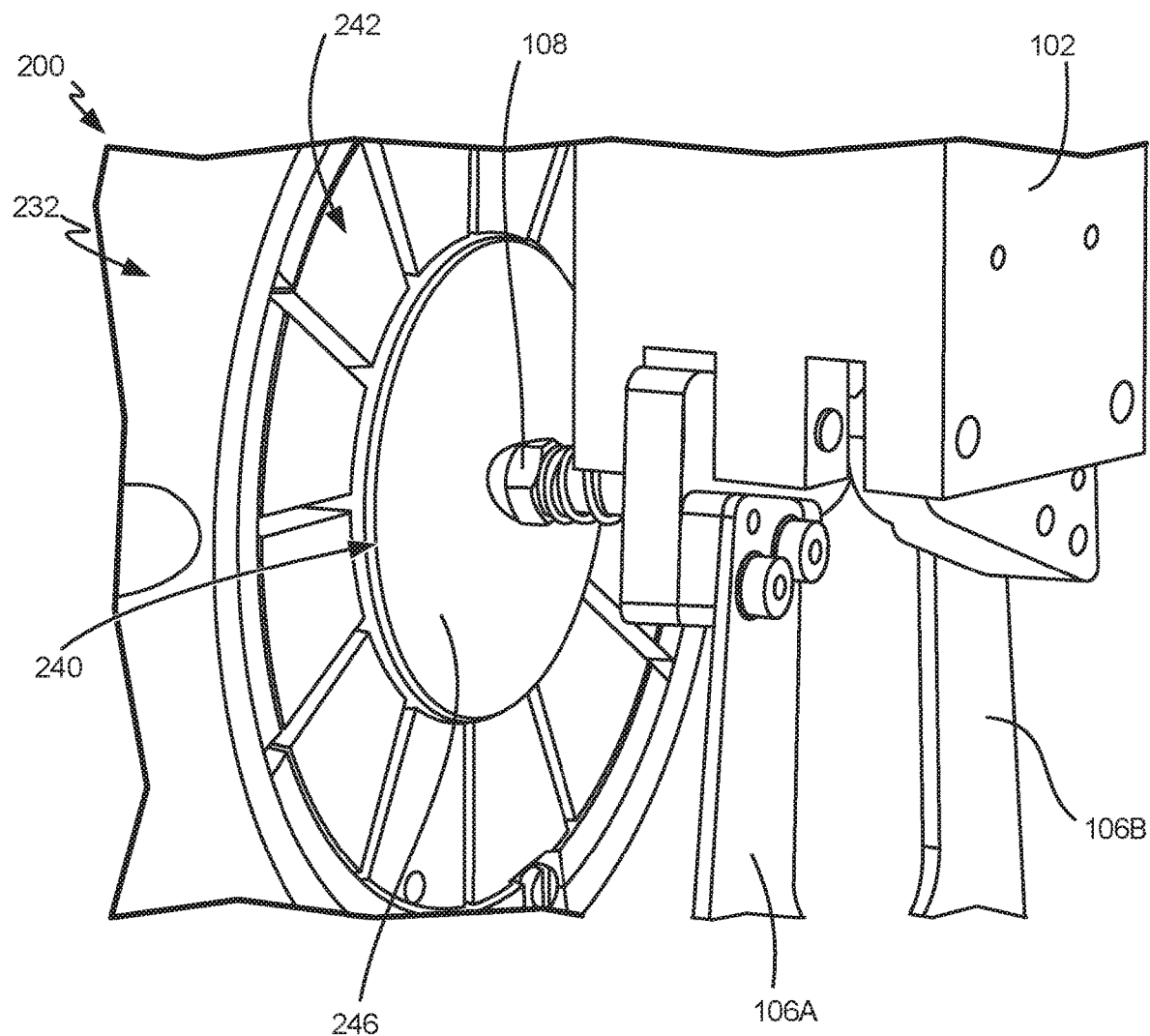
FIG. 5 illustrates an isometric view of a portion of a gripper system in a third condition, in accordance with at least one example of the present disclosure.

(as shown in FIGS. 3-5 below). X-axis motor 226 can be configured to translate tool holder 214 parallel to an x-axis. Y-axis motor 228 can be configured to translate tool holder 214 parallel to a y-axis. Z-axis motor 230 can be configured to translate tool holder 214 parallel to a Z-axis. And, spindle motor 224 can be configured to rotate tool holder 214. Together, spindle motor 224, x-axis motor 226, y-axis motor 228, and z-axis motor 230 can be controlled (by controller 222) to move tool holder 214 in any direction relative to machine 232.

In operation of some examples, a workpiece can be inserted into machine 232, for example by hand or by gripper 100 using methods similar to those described below. Machine 232 can then perform an operation on the workpiece, such as cutting or turning, for example. Thereafter, when the workpiece needs to be flipped, controller 222 can enable one or more of spindle motor 224, x-axis motor 226, y-axis motor 228, and z-axis motor 230 to position gripper 100 at the workpiece. Controller 222 can then enable pump 216 so that pump 216 can pressurize fluid (such as coolant), motivating the fluid to flow to pressure regulator 218 and on to tool holder 214 via fluid lines 238. Tool holder 214 can deliver the fluid to gripper 100, where the pressurized fluid can drive an internal piston of gripper 100, which can cause the fingers of gripper 100 to open.

While pump 216 is running, fluid can be constantly relieved from tool holder 214 back into fluid lines 238. In some other examples, fluid can be relieved to an atmospheric condition, where the fluid can be collected (for example using a collection pan or drain pan) and provided to an inlet side of pump 216. In either case, pump 216 can recirculate the fluid (or otherwise pump fluid) to provide constant fluid pressure to the inlet of tool holder 214 until controller disables pump 216. When fluid pressure is reduced or eliminated at the tool holder, a biasing element within gripper 100 can cause the fingers of gripper to close. The fingers of gripper 100 can remain closed until fluid pressure at the inlet of tool holder 214 reaches a threshold to reopen the fingers of gripper 100. In this way, gripper 100 (and gripper system 200) can be used to grip and position a workpiece in a machine, which can save time and cost of manufacturing operations. Further operations of system 200 are discussed in FIGS. 3-5 below and FIG. 12 further below.

FIG. 3 illustrates an isometric view of a portion of gripper system 200 in a first condition, in accordance with at least one example of the present disclosure. FIG. 4 illustrates an isometric view of a portion of gripper system 200 in a second condition, in accordance with at least one example of the present disclosure. FIG. 5 illustrates an isometric view of a portion of gripper system 200 in a third condition, in accordance with at least one example of the present disclosure. FIGS. 3-5 are discussed below concurrently.

Gripper system 200 can include gripper 100, machine 232, and workpiece 240. Gripper 100 can include gripper body 102, first finger 106A, second finger 106B, and plunger 108. Machine 232 can include chuck 242. Workpiece 240 can include finished portion 244 (FIGS. 3 and 4) and unfinished portion 246 (FIG. 5).

The components of gripper system 200 as shown in FIGS. 3-5 can be consistent with those of FIGS. 1 and 2 above. However, FIGS. 3-5 show some further details. For example, FIGS. 3-5 show workpiece 240, which can be a component on which operations can be performed. For example, workpiece 240 can begin as a piece of bar stock of a metal, such as aluminum, steel, titanium, and the like. In some other examples, workpiece 240 can be comprised of other materials, such as plastics. Workpiece 240 can include finished portion 244 which may have already had operations performed thereon and can include unfinished portion 246 which may not have already had operations performed thereon. In some examples, a circumferential lip can separate finished portion 244 and unfinished portion 246, as shown in FIGS. 3-5.

FIGS. 3-5 also show machine 232, which can be a machine configured to secure and move workpieces, such as workpiece 240. As shown in FIGS. 3-5, machine 232 can include chuck 242, which can be a remotely and electronically operable vice mechanism configured to symmetrically secure a workpiece to machine 232. As shown in FIG. 3, workpiece 240 can be securable within chuck 242 of machine 232.

In operation of some examples, gripper 100 can be positioned at machine 232 and can be operated to close first finger 106A and second finger 106B around workpiece 240, securing workpiece 240 between first finger 106A and second finger 106B. Once workpiece 240 is secured between first finger 106A and second finger 106B, chuck 242 can be opened and gripper 100 can be moved away from machine 232, and workpiece 240 can be moved out of chuck 242, as shown in FIG. 4. With the chuck still open, workpiece 240 can be flipped by gripper 100, such that finished portion 244 faces machine 232, as shown in FIG. 4.

As shown in FIG. 5, after workpiece 240 has been flipped, gripper 100 can insert workpiece 240 into chuck 242. Chuck 242 can then be closed and gripper 100 can be positioned so that plunger 108 applies a pressure on unfinished portion 246 generally towards machine 232. Chuck 242 can then be opened so that plunger 108 can force workpiece 240 to fully seat into chuck 242 of machine 232, leaving unfinished portion 246 extending from chuck 242. The operations performed by gripper 100 can reduce the number of operations performed by an operator (such as a human), for example, removing and reinserting workpiece 240, saving time and cost.

Figure 6:
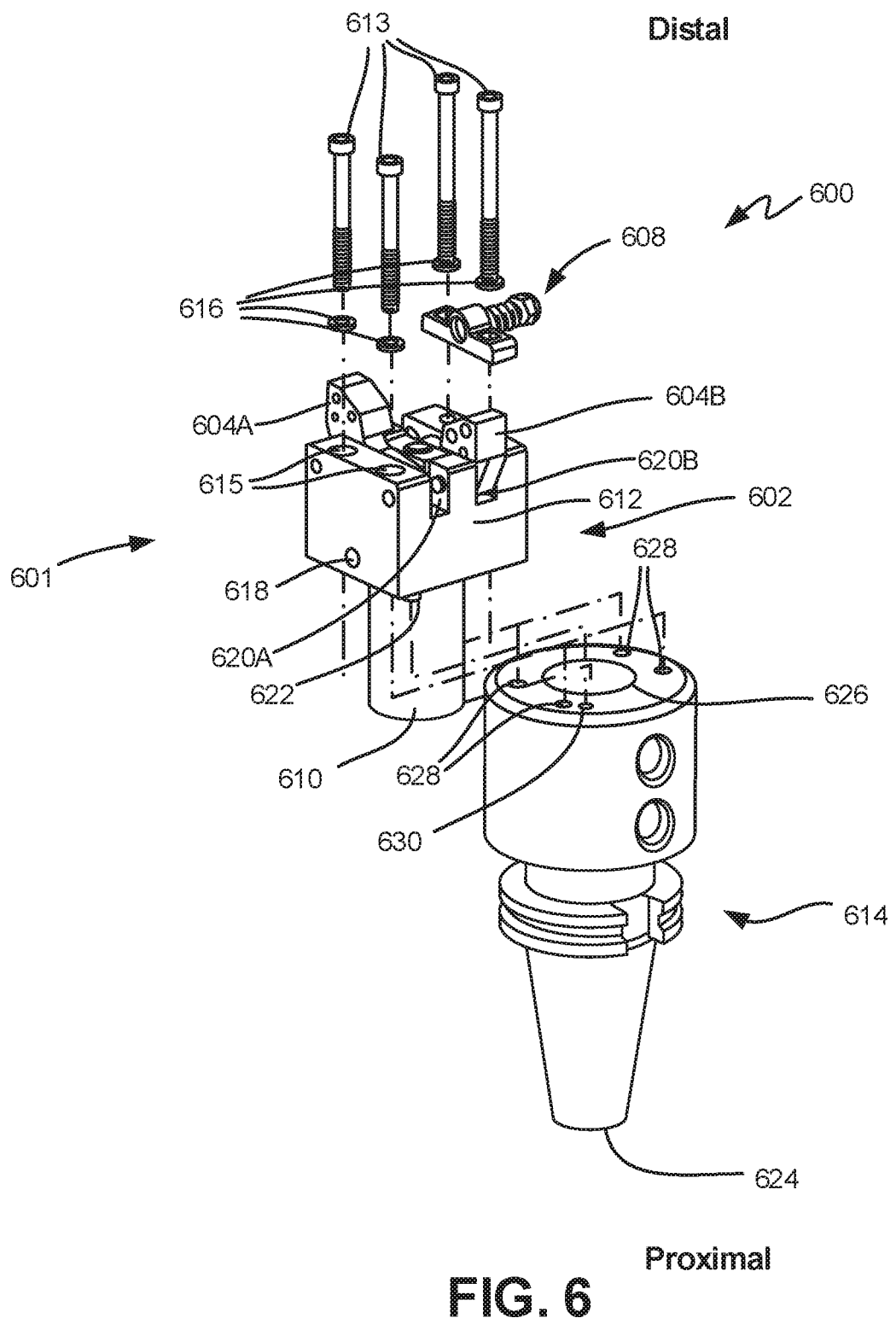
FIG. 6 illustrates an exploded view of a gripper, in accordance with at least one example of the present disclosure.

FIG. 6 illustrates an exploded view of gripper system 600, in accordance with at least one example of the present disclosure. Gripper system 600 can include gripper 601 and tool holder 614. Gripper 601 can include gripper body 602, first gripper arm 604A, second gripper arm 604B, plunger 608, proximal portion 610, distal portion 612, fasteners 613, mating bores 615, washers 616, pressure relief port 618, arm slot 620A, arm slot 620B, and alignment protrusion 622. Tool holder 614 can include tool holder fluid inlet 624, tool holder central bore 626, mating bores 628, and alignment bore 630. FIG. 6 also shows orientation indicators Proximal and Distal.

Gripper system 600 can be similar to gripper system 200 of FIGS. 2-5 above and gripper 601 can be similar to gripper 100 of FIGS. 1-5 above.

Gripper body 602 can be a body configured to support the components of gripper 601. Gripper body 602 can be comprised of a rigid material, such as metals, plastics, and combinations thereof. Proximal portion 610 can be a substantially cylindrical portion that is configured to insert into tool holder central bore 626, as described further below. Proximal portion 610 can include a central bore to support moving components therein, as also described further below. Distal portion 612 can have a substantially rectangular prismatic geometric shape and can be coupled to a distal end of proximal portion 610 at a proximal end of distal portion 612.

Distal portion 612 can also include arm slot 620A and arm slot 620B, which can be sized to receive arms 604A and 604B therein, respectively. Arms 604A and 604B can be pivotably coupled to distal portion 612 within arms slots 620A and 620B, respectively. Plunger 608 can be coupled to a distal end of distal portion 612, in some examples.

Fasteners 613 can be bolts, screws, or other fasteners, in some examples. Washers 616 can be sized to receive fasteners 613 therethrough and can be configured to mount between fasteners 613 and a distal end of distal portion 612. Mating bores 615 of distal portion 612 can align with mating bores 628 of proximal portion 610. Mating bores 615 can extend through distal portion 612, while mating bores 628 can terminate within proximal portion 610. Fasteners 613 can be configured to extend through washers 616, through mating bores 615 of distal portion 612 and into mating bores 628 of proximal portion 610, where fasteners 613 can be threadably secured to mating bores 615 and/or mating bores 628. In some examples, alignment protrusion 622 can be a protuberance of distal portion 612 extending proximally from a proximal surface of distal portion 612. Alignment bore 630 can be complimentary to alignment protrusion 622 and can extend proximally from a distal surface of distal portion 610 into proximal portion 610. During assembly, alignment protrusion 622 can be inserted into alignment bore 630 before fasteners 613 are inserted into mating bores 615 and mating bores 628 to ensure that distal portion 612 is properly oriented on proximal portion 610.

Distal portion 612 can also include pressure relief port 618, which can intersect with a central bore of gripper body 602. Pressure relief port 618 can include a pressure relief valve or other pressure relief device, such as a burst cap, configured to relieve pressure from gripper body 602 when a maximum internal pressure is reached. The pressure relief device can have a relief pressure below the maximum pressure of internal seals (such as piston seals) to protect the seals and other internal components.

Tool holder central bore 626 can be substantially cylindrical and can be sized to receive proximal portion 610 of gripper body 602 therein. Tool holder fluid inlet 624 can be configured to couple to a fluid line (as shown in FIG. 2), allowing tool holder 614 to receive a fluid.

Figure 7:
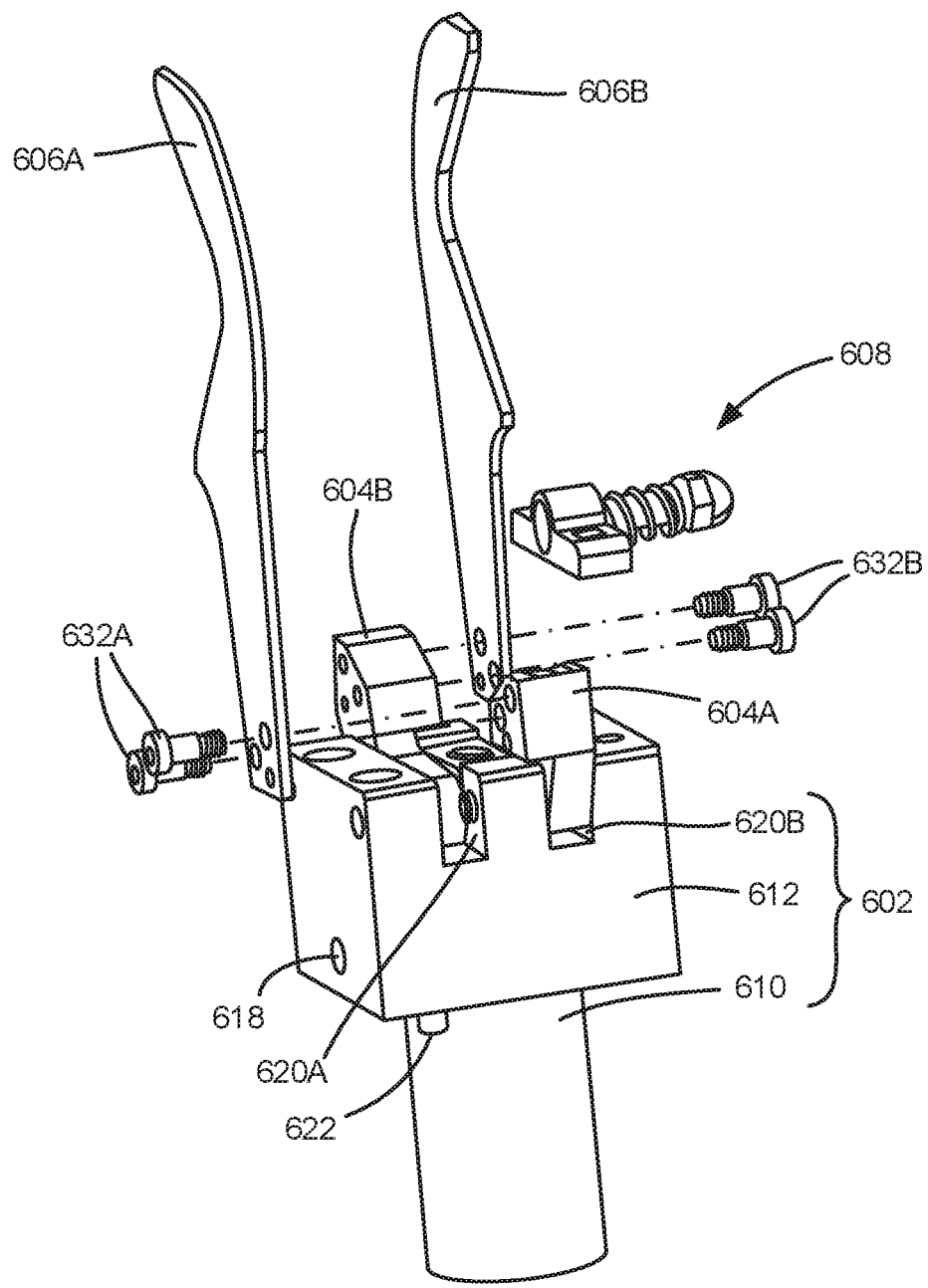
FIG. 7 illustrates an exploded view of a gripper, in accordance with at least one example of the present disclosure.

FIG. 7 illustrates an exploded view of gripper 601, in accordance with at least one example of the present disclosure. Gripper 601 can include gripper body 602, first gripper arm 604A, second gripper arm 604B, first finger 606A, second finger 606B, plunger 608, proximal portion 610, distal portion 612, pressure relief port 618, arm slot 620A, arm slot 620B, and fasteners 632A and 632B. FIG. 7 also shows orientation indicators Proximal and Distal.

FIG. 7 is similar to FIG. 6, except that FIG. 7 shows fingers 606A and 606B and an example of how they can connect to gripper body 602. A proximal portion of each of fingers 606A and 606B can include bores configured to receive fasteners 632A and 632B. The bores of first finger 606A can align with bores of first arm 604A. Similarly, the bores of second finger 606A can align with bores of second arm 604A. Fasteners 632A can pass through the bores of first finger 606A and can be threaded into first arm 604A to secure first finger 606A to first arm 604A. Similarly, fasteners 632B can pass through the bores of second finger 606B and can be threaded into second arm 604B to secure second finger 606B to second arm 604B.

Figure 8:
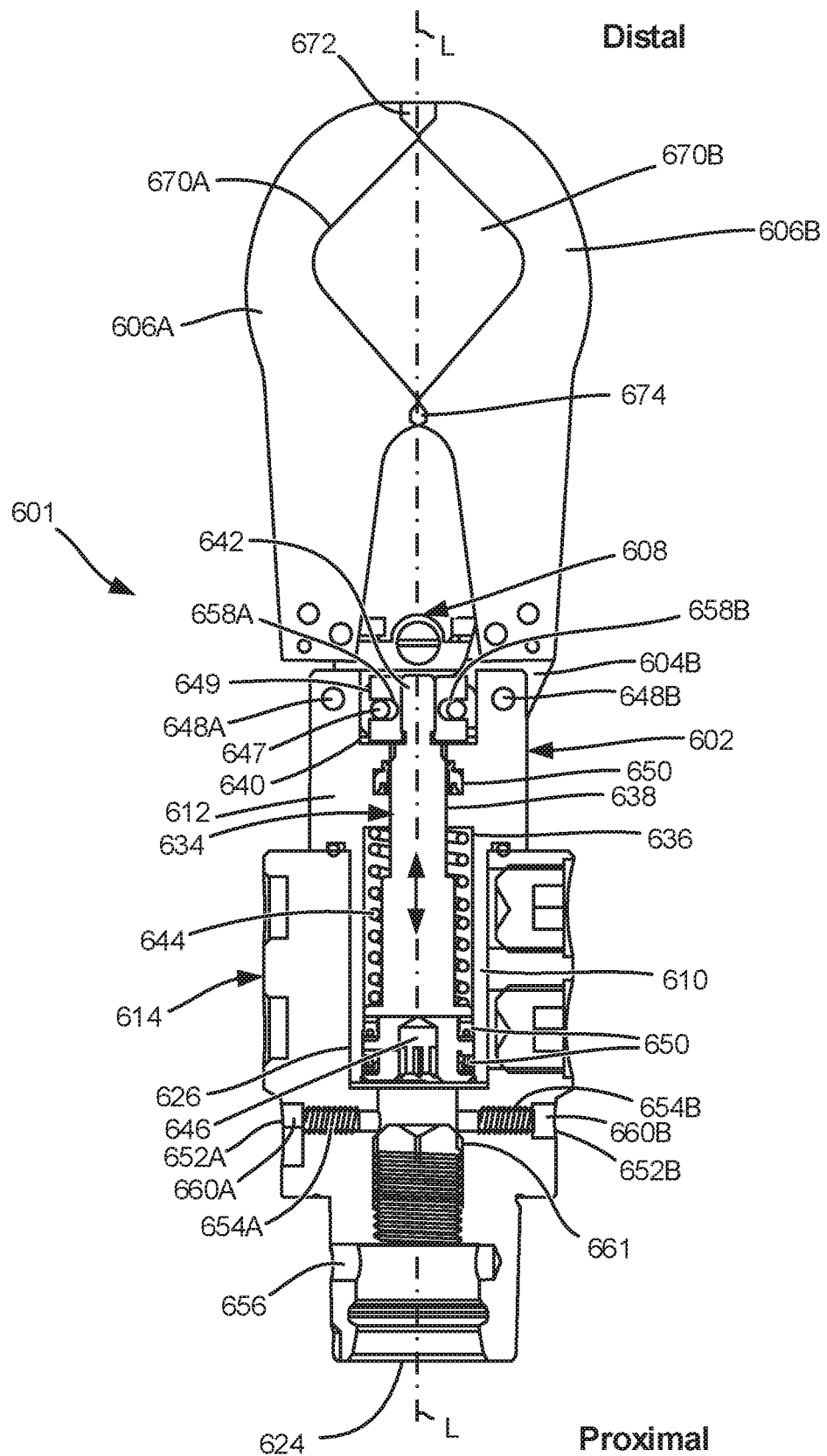
FIG. 8 illustrates a cross sectional view of a gripper, in accordance with at least one example of the present disclosure.
Figure 9:
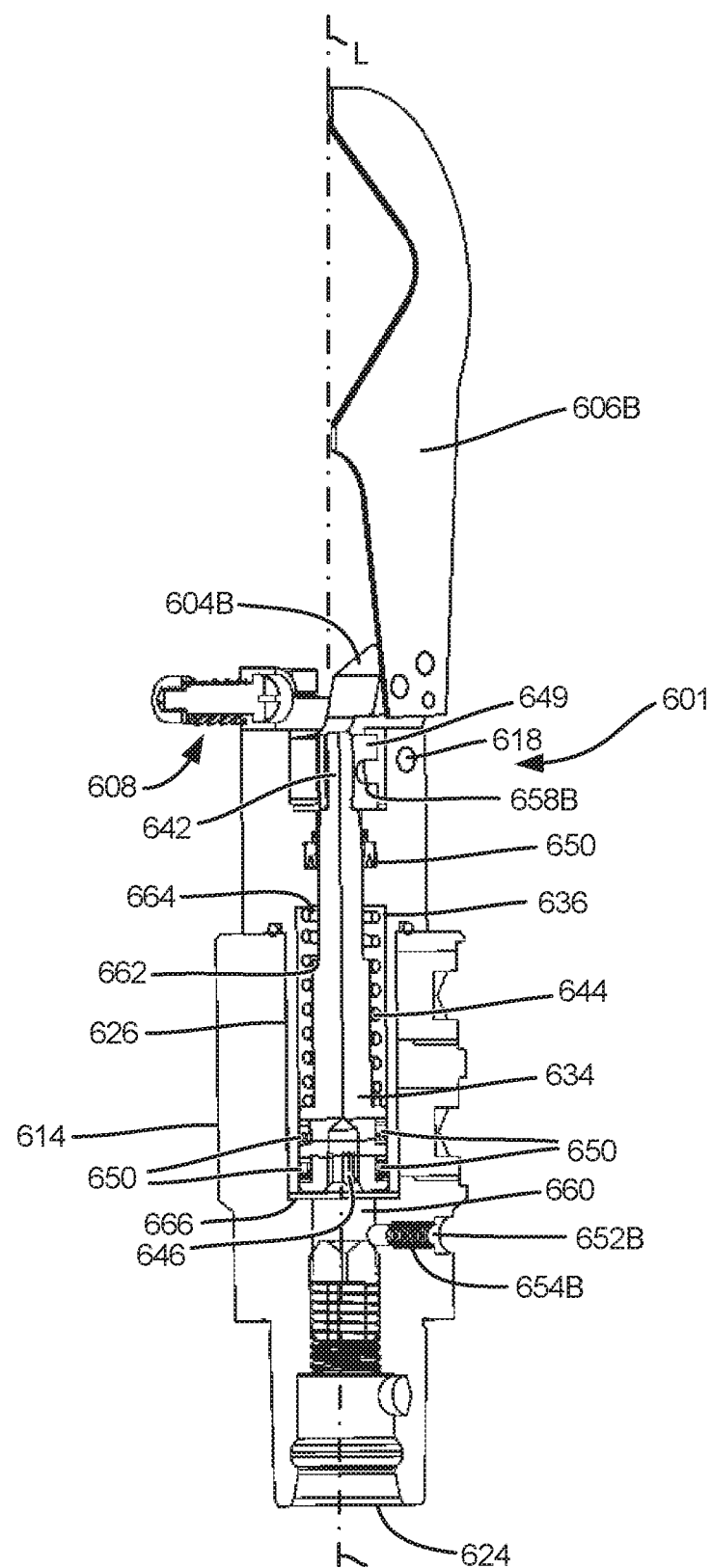
FIG. 9 illustrates a cross sectional view of a gripper, in accordance with at least one example of the present disclosure.

FIG. 8 illustrates a cross sectional view gripper system 600, in accordance with at least one example of the present disclosure. FIG. 9 illustrates a cross sectional view gripper system 600, in accordance with at least one example of the present disclosure. FIGS. 8 and 9 are discussed below concurrently.

Gripper system 600 can include gripper 601 and tool holder 614. Gripper 601 can include gripper body 602, first gripper arm 604A, second gripper arm 604B (only second gripper arm 604B is visible in FIGS. 8 and 9), plunger 608, proximal portion 610, distal portion 612. Gripper body 602 can include piston 634, gripper bore 636, piston bore 638, actuator bore 640, and biasing element 644. Piston 634 can include central shaft 644 and pressure bore 646. Gripper 601 can also include actuating pin 647, pivot pins 648A and 648B, actuator 649 and piston seals 650. Tool holder 614 can include tool holder fluid inlet 624, tool holder central bore 626, pressure relief bores 652A and 652B (which can respectively include threaded portion 654A and 654B), spindle alignment bore 656, set screws 660A and 660B, and fluid bore 661. Actuator 649 can include notches 658A and 658B. FIGS. 8 and 9 also show central longitudinal axis L and orientation indicators Proximal and Distal.

Piston 634 can be a rigid member comprised of materials such as plastics, metals, and combinations thereof. Piston 634 can be stepped or tiered to have several diameters. A distal portion of piston 634 can be sized to form a seal (together with piston seals 650) within gripper bore 636. Central shaft 642 can be of a smaller diameter, in some examples, configured to threadably secure to actuator 640 at a distal portion of piston 634. Piston 634 can include additional diameter variations between proximal and distal ends to accommodate seals, for example, proximal of central shaft 642, as discussed below. Pressure bore 646 can be a bore extending from a proximal face of piston 634 distally into and terminating in piston 634.

Piston 634 can also include taper 662 (labeled only in FIG. 9), which can be an undercut engageable with a radial surface of the undercut between piston bore 638 and gripper bore 636 (labeled as 664 only in FIG. 9). Contact between piston 634 and undercut 664 can limit distal translation of piston 634. Similarly, contact between a proximal surface of piston 634 and a radial surface between fluid bore 661 and tool holder central bore 626 (labeled as 666 in FIG. 9 only) can limit proximal translation of piston 634.

Gripper bore 636, piston bore 638, and actuator bore 640 can be generally cylindrical bores coaxial with central longitudinal axis L. Actuator bore 640 can be sized to retain actuator 649. Biasing element 644 can be a compression spring, such as a coil or wave spring, in some examples. Biasing element 644 can be sized to be disposed within gripper bore 636. Biasing element can be disposed around piston 634 and can be in contact with a radial face of gripper bore Actuator 640 can be a rigid member threadably coupled to central shaft 642 and therefore piston 634. Actuator 640 can include notches 658A and 658B that can be open to each side of actuator 640 (orthogonal to central longitudinal axis L).

Actuating pin 647 can be coupled to arm 604A. In some examples, actuating pin 647 can be a separate pin. In other examples, actuating pin 647 can be integral to arm 604A. Another actuating pin can be similarly coupled to arm 604B (not shown). Pivot pins 648A and 648B, can pass through each of arms 604A and 604B respectively and can be secured to a distal portion of distal portion 612. Pivot pins 648A and 648B can secure arms 604A and 604B, respectively, to distal portion 612. Pivot pins 648A and 648B also can form, for example, a journal bearing about which arms 604A and 604B can pivot relative to distal portion 612.

Tool holder fluid inlet 624 can be disposed at a proximal termination of tool holder 614 and can be sized and configured to receive and/or secure to a fluid line or connector. Fluid inlet 624 can be coaxial with fluid bore 661 and central longitudinal bore L. Fluid inlet 624 can be fluidly connected to fluid bore 661, which can be fluidly connected with pressure relief ports 652A and 652B. Fluid bore 661 can also be in fluid communication with fluid pressure bore 646 of piston 636 and a proximal face of piston 636.

Pressure relief bores 652A and 652B can respectively include threaded portions 654A and 654B, which can each be sized to receive set screws 660A and 660B. Set screws 660A and 660B can threadably couple to threaded portions 654A and 654B of pressure relief bores 652A and 652B, respectively. Set screws 660A and 660B can each include an internal bore defining the smallest restriction of a fluid relief pathway and therefore controlling a fluid relief flowrate for a given fluid pressure. In some examples, pressure relief bores 652A and 652B can be configured to accept set screws 660A and 660B of different diameters so that an operating pressure within gripper 601 as created by fluid pressure is selectable by changing set screws 660A and 660B to have a larger or smaller diameter, allowing gripper system 600 to be used with multiple pumps and at multiple pressures and flowrates.

Spindle alignment bore 656 can be configured to engage a component of a spindle motor, such as spindle motor 224 of FIG. 2. Together, the component and spindle alignment bore 656 can ensure that tool holder 614 is properly oriented relative to the spindle motor.

In operation of some examples, tool holder 614 can be coupled to a spindle motor and can be coupled to a fluid line (as shown in FIG. 2) at fluid inlet 624. When pressurized fluid is provided to tool holder 614, the fluid can enter fluid inlet 624 and travel into fluid bore 661. The fluid can exit through set screws 660A and 660B of pressure relief ports 652A and 652B. The pressure of the fluid within fluid bore 661 will be determined by the flow rate of the fluid exiting pressure relief ports 652A and 652B. When fluid pressure is provided to fluid bore 661, fluid pressure is communicated to gripper bore 636.

Biasing element 642 can apply a force on piston 634 biasing piston 634 to a distal position so that a proximal face of piston 634 is in close proximity to a termination of fluid bore 661 such that when fluid pressure is present in fluid port 661, fluid pressure can be applied to piston 634. Further, fluid pressure can be applied to pressure bore 646. Fluid pressure applied to piston 634 (and pressure bore 646) can force piston 634 to translate distally when the fluid pressure force overcomes a generally proximally directed force applied to piston 634 by biasing element 644.

As piston 634 translates distally, so too does central rod 642. Because central rod 642 is coupled to actuator 649, distal translation of piston 624 results in distal translation of actuator 649. As actuator 649 actuates, notches 658A and 658B translate as well, forcing actuator pins 647 to distally translate. Because arms 604A and 604B are pinned to gripper body 602, translation of actuator pins 647 causes arms 604A and 604B to rotate about pivot pins 648A and 648B, respectively. The rotation of arms 604A and 604B causes rotation of fingers 606A and 606B, driving fingers 606A and 606B to an open position until piston 634 contacts radial surface 664 and/or the force created by fluid pressure on piston 634 drops to or below the bias force applied to piston 634 by biasing element 644.

When the fluid pressure on piston 634 drops below the bias force applied to piston 634 by biasing element 644, biasing element 644 can force piston 634 to translate proximally, causing central shaft 642, actuator 649, and actuator pins 647 to translate proximally. The proximal translation of these components can cause arms 604A and 604B and therefore fingers 606A and 606B to rotate to a closed position.

Gripper fingers 606A and 606B can include recessed or curved portions 670A and 670B (labeled only in FIG. 8), which together can form a shape that conforms to a workpiece when fingers 606A and 606B are in a closed positions. Further, fingers 606A and 606B can include tips at locations 672 and 674 that can overlap and/or contact when fingers 606A and 606B are in a closed position, that is, when piston 634 is in a first or proximal position.

Figure 10:
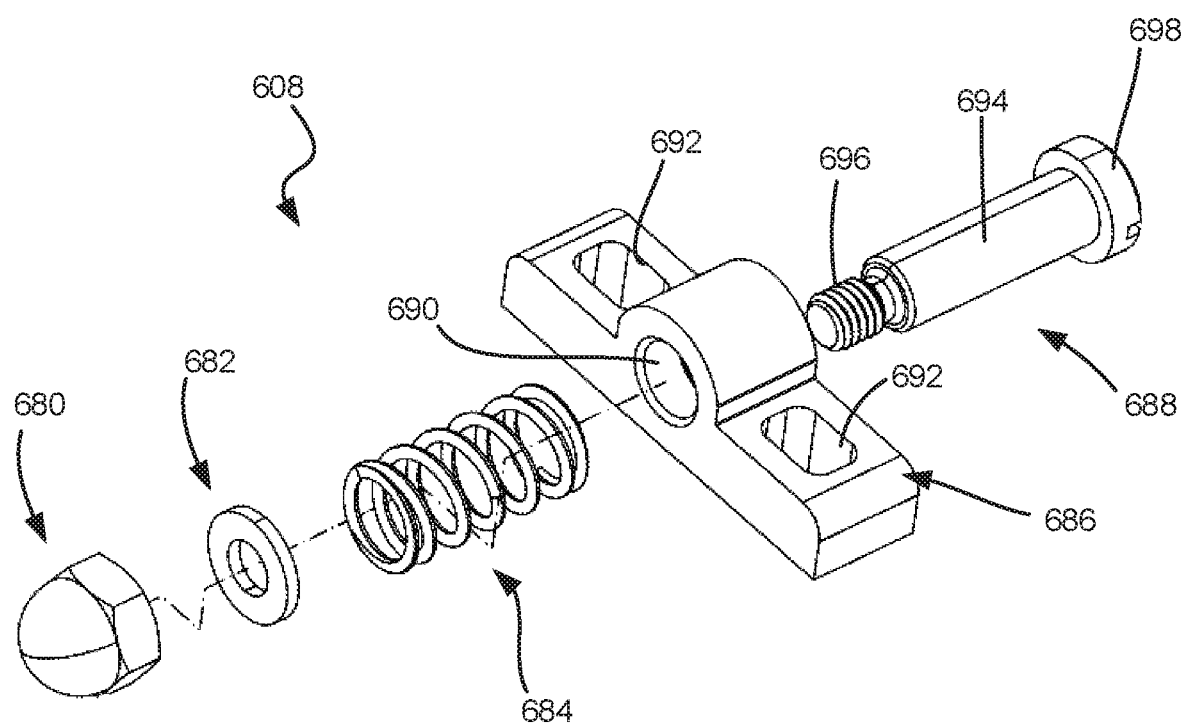
FIG. 10 illustrates an exploded view of a plunger, in accordance with at least one example of the present disclosure.

FIG. 10 illustrates an exploded view of plunger 608, in accordance with at least one example of the present disclosure. Plunger 608 can include nut 680, washer 682, biasing element 684, bracket 686, and bolt 688. Bracket 686 can include central bore 690 and mounting bores 692. Bolt can include shaft 694, threaded portion 696, and head 698.

Mounting bores 692 of bracket 686 can be used to secure bracket 686 and therefore plunger 608 to gripper 601. Central bore 690 of bracket 686 can receive shaft 694 of bolt 688 therethrough. Bolt 688 can be a shoulder bolt, in some examples, wherein head 698 of bolt 688 can limit translation of bolt 688 relative to bracket 686.

Biasing element 684 can be a compression spring, in some examples, configured to be disposed around shaft 694 of bolt 688. Nut 680 can engage threaded portion 696 of bolt 688 to secure shaft 694 within central bore 690 of bracket 686. In operation of some examples, plunger 608 can act as a sprung rod when bracket 686 is secured to gripper 601.

Figure 11A:
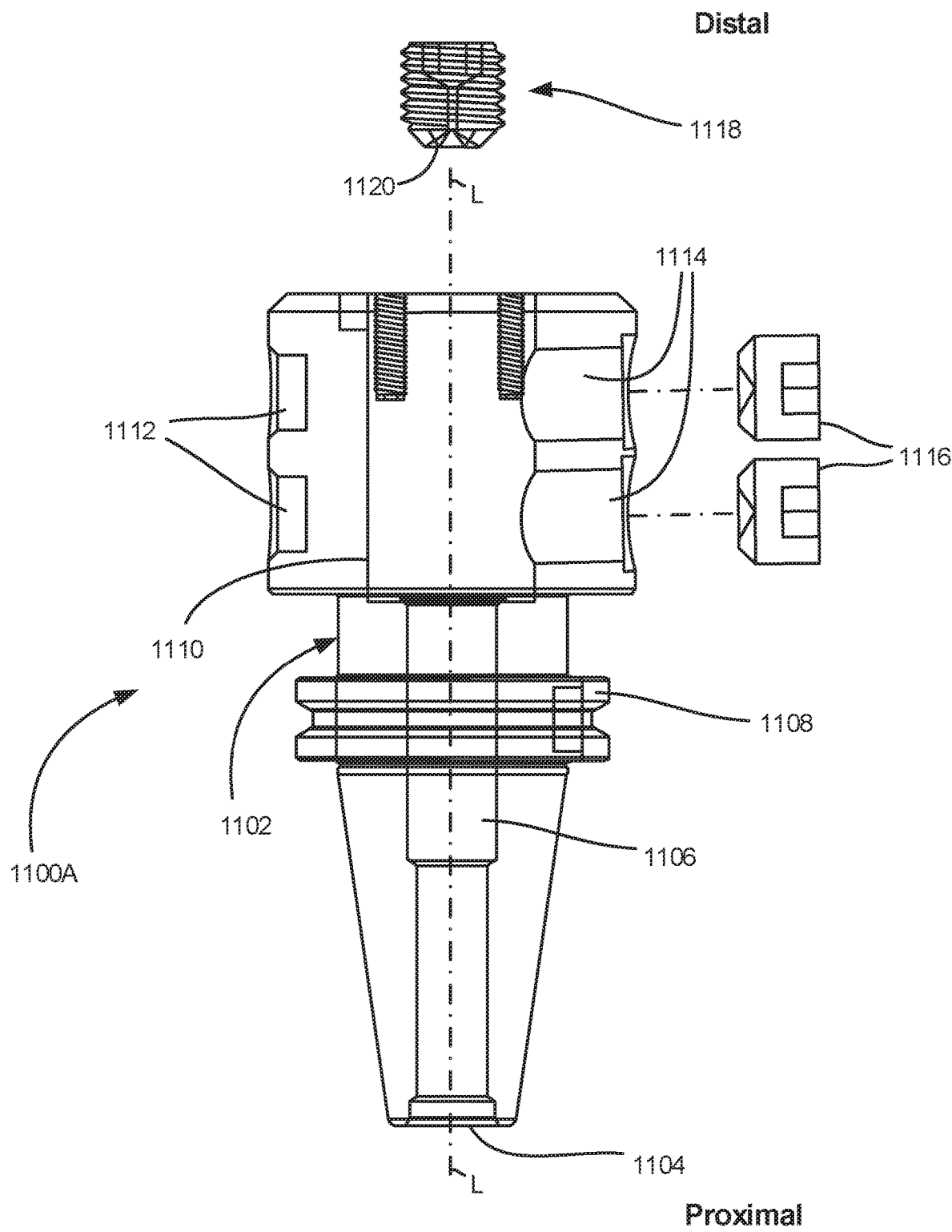
FIG. 11A illustrates an elevation view of a tool holder, in accordance with at least one example of the present disclosure.

FIG. 11A illustrates an elevation view of tool holder 1100A, in accordance with at least one example of the present disclosure. Tool holder 1100A can include body 1102, fluid inlet 1104, fluid bore 1106, coupling ring 1108, tool holder bore 1110, balancing bores 1112, set screw bores 1114, set strews 1116, and insert 1118 (including limiting bore 1120). Also shown in FIG. 11A is central longitudinal axis L and orientation indicators Proximal and Distal.

Body 1102 can be a rigid member formed of materials such as metals, plastics, and combinations thereof. Body 1102 can include fluid inlet 1104 disposed at a proximal portion of body 1102 and can be configured to couple to a fluid pipe or conduit, as described above. Fluid inlet 1104 can be in fluid communication with fluid bore 1106, which can be in fluid communication with tool holder bore 1100, where fluid inlet 1104, fluid bore 1106, and tool holder bore 1110 can all be coaxial with central longitudinal axis L. Fluid bore 1106 can be sized to threadably receive insert 1118 and tool holder bore 1110 can be sized to receive a gripper (as described above).

Coupling ring 1108 can be disposed around a circumference of a proximal portion of tool holder 1100A and can be configured to couple tool holder 1100A to a spindle motor and/or pressure relief lines connecting to pressure relief bores within tool holder 1100A.

Balancing bores 1112 can be disposed in a distal portion of tool holder 1100A opposite set screw bores 1114, and can be configured to balance a mass of tool holder 1100A about central longitudinal bore L. Balancing bores 1112 can extend from an outer circumference of tool holder 1100A radially inward and can terminate prior to reaching tool holder bore 1110. Set screw bores, however, can extend from an outer circumference of tool holder 1100A radially inward and can intersect with tool holder bore 1110, so that set screws 1116 can be threadably inserted into set screw bores to engage a tool (such as a gripper) and retain the tool within tool holder bore 1110. In some examples, set screws 1116 can be welded into set screw bores 1114 to prevent use in such a manner while hermetically sealing set screw bores 1114.

Insert 1118 can be threaded into fluid bore 1106. Limiting bore 1120 can have a diameter significantly smaller than a diameter of fluid bore 1106 to control a flow rate of fluid from fluid inlet 1104. In some examples, tool holder 1100A can be sized to receive inserts having varying limiting bore diameters to enable tool holder to receive various fluid flow rates, as desired.

Figure 11B:
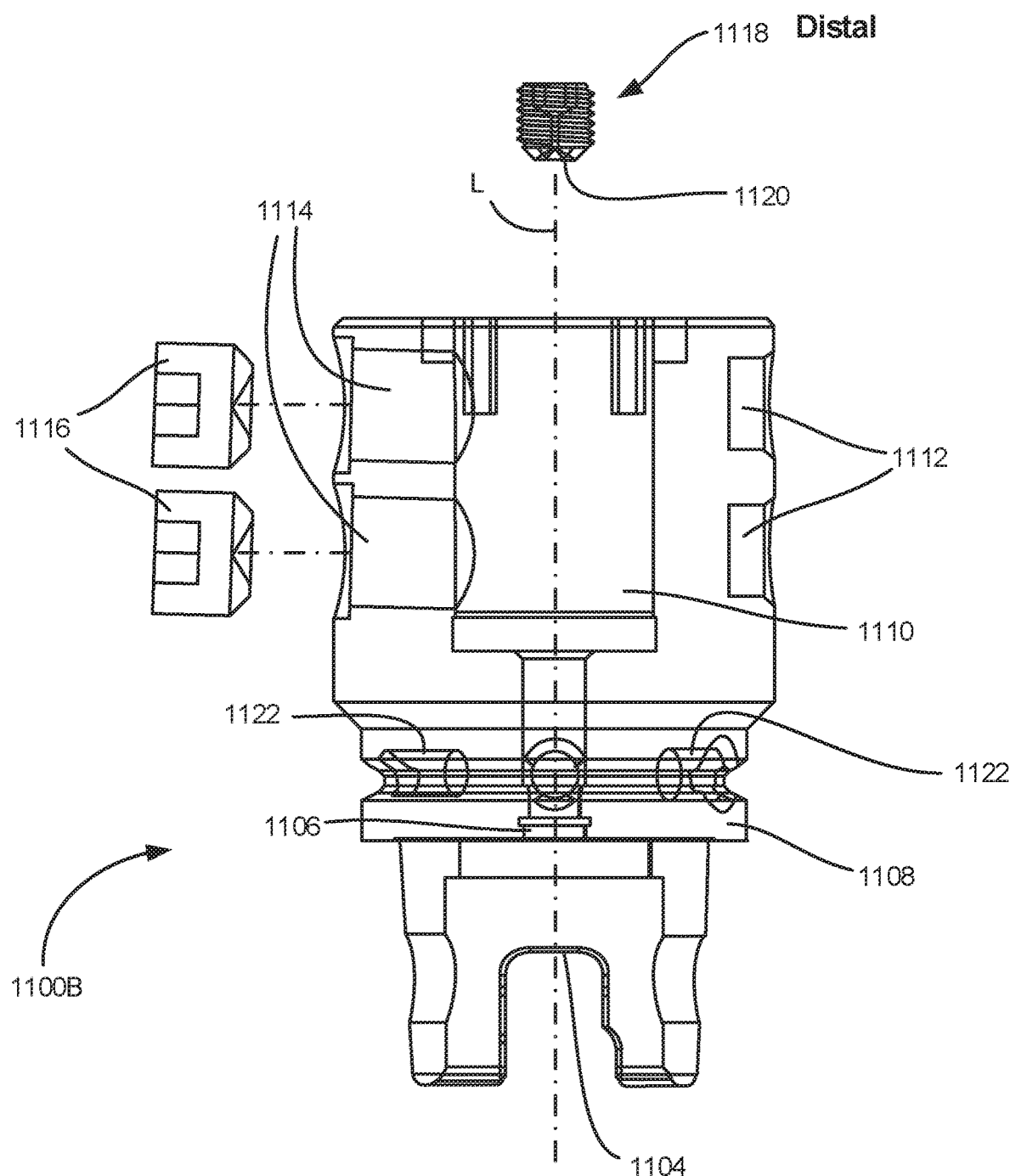
FIG. 11B illustrates an elevation view of a tool holder, in accordance with at least one example of the present disclosure.

FIG. 11B illustrates an elevation view of tool holder 1100B, in accordance with at least one example of the present disclosure. Tool holder 1100B can include body 1102, fluid inlet 1104, fluid bore 1106, coupling ring 1108, tool holder bore 1110, balancing bores 1112, set screw bores 1114, set strews 1116, insert 1118 (including limiting bore 1120), and pressure relief ports 1122. Also shown in FIG. 11B is central longitudinal axis L and orientation indicators Proximal and Distal.

Tool holder 1100B can be similar to tool holder 1100A, except that a proximal portion of tool holder 1100B can have a different profile, for example, fluid inlet 1104 of tool holder 1100B can include a recessed portion. Also shown in FIG. 11B are pressure relief ports 1122, which can be fluidly coupled to fluid bore 1106, in some examples.

Figure 11C:
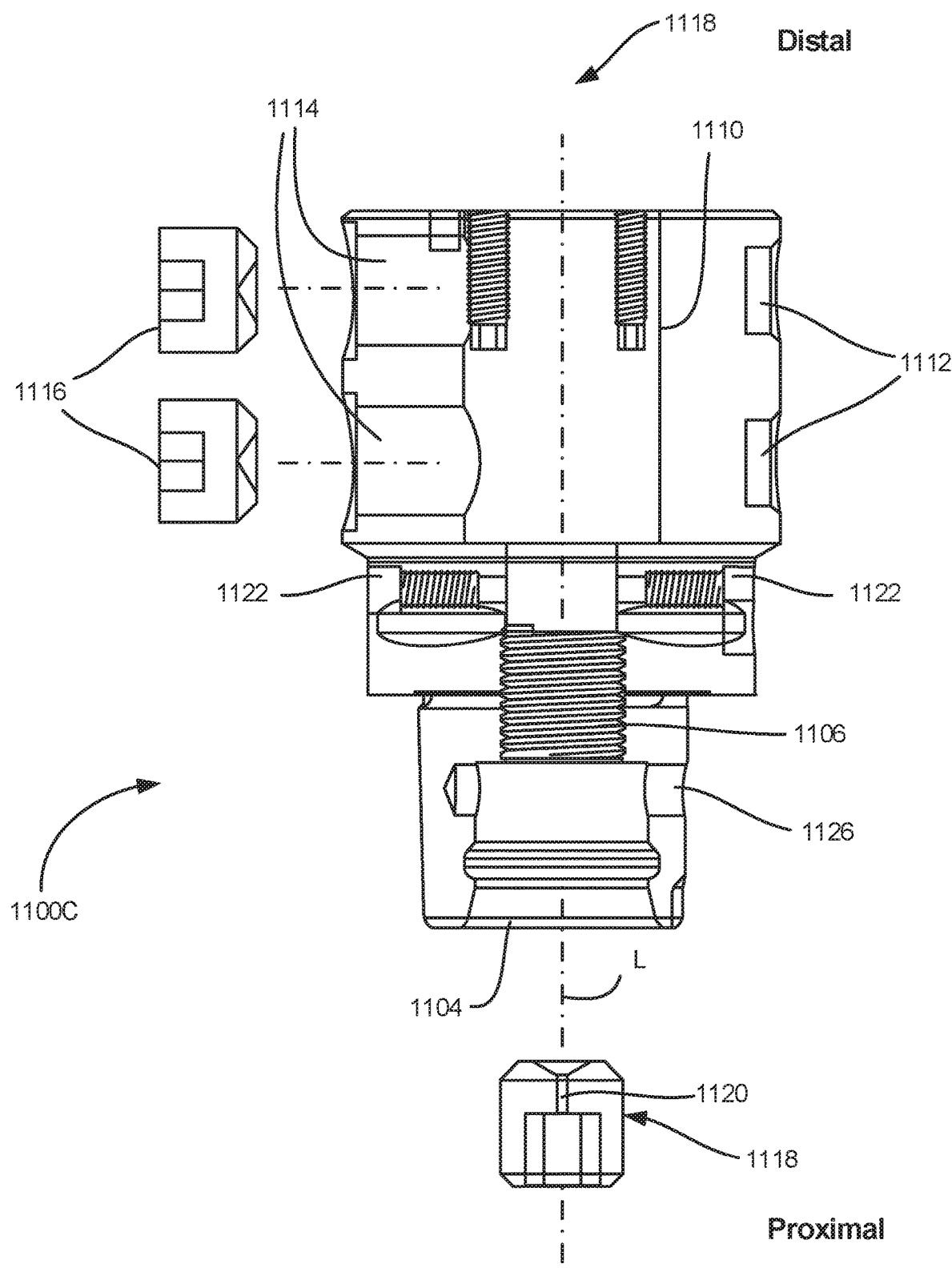
FIG. 11C illustrates an elevation view of a tool holder, in accordance with at least one example of the present disclosure.

FIG. 11C illustrates an elevation view of tool holder 1100C, in accordance with at least one example of the present disclosure. Tool holder 1100C can include body 1102, fluid inlet 1104, fluid bore 1106, coupling ring 1108, tool holder bore 1110, balancing bores 1112, set screw bores 1114, set strews 1116, and insert 1118 (including limiting bore 1120). Also shown in FIG. 11C is central longitudinal axis L and orientation indicators Proximal and Distal.

Tool holder 1100C can be similar to tool holders 1100A and 1100B, except that a proximal portion of tool holder 1100B can have a different profile. Also, FIG. 11C shows alignment bore 1126, which can ensure proper orientation of tool holder 1100C to a spindle motor, in some examples.

Figure 12:
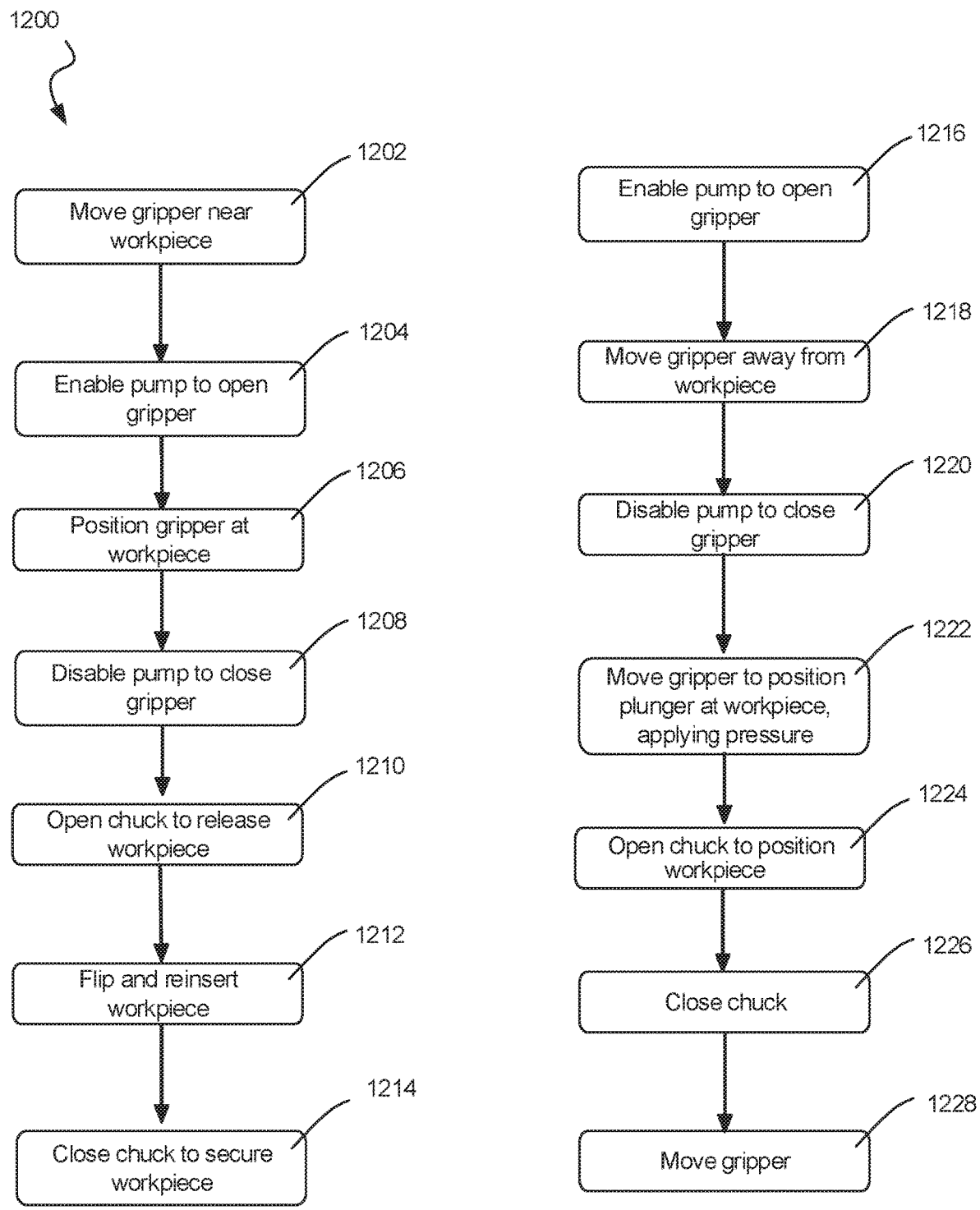
FIG. 12 illustrates a flow chart view of a method, in accordance with at least one example of the present disclosure.

FIG. 12 shows a flow chart of using the devices and systems described above, in accordance with at least one example of this disclosure. The steps or operations of the method of FIG. 12 are illustrated in a particular order for convenience and clarity. Many of the discussed operations can be performed in a different sequence or in parallel, and some operations may be excluded, without materially impacting other operations. The method of FIG. 12, as discussed, includes operations that may be performed by multiple different actors, devices, and/or systems. It is understood that subsets of the operations discussed in the method of FIG. 12 that are attributable to a single actor, device, or system could be considered a separate standalone process or method.

In operation of one example, method 1200 can begin with step 1202, where a gripper (such as gripper 100 of FIG. 1) can be moved near a workpiece (such as workpiece 240 of FIGS. 3-5) using motors (such as motors 224, 226, 228, and 230 of FIG. 2), as directed by a user interface and a controller (such as user interface 236 and controller 222 of FIG. 2).

At step 1204 the controller can enable a pump (such as pump 216 of FIG. 2) to pump or pressurize a fluid. The fluid can be delivered to the gripper via gripper lines and the pressure can be limited by a pressure regulator, and or set screws within a tool holder coupled to the gripper (as described above). The fluid pressure can operate a piston within the gripper to translate, opening fingers of the gripper. Once the gripper is open, the motors can be directed to position the gripper at the workpiece at step 1206. Then, at step 1208, the pump can be disabled (or the pump pressure can be reduced) to allow a biasing element within the gripper to move the piston to the first position to close fingers of the gripper around the workpiece, securing the workpiece to the gripper. Once the workpiece is secured, the controller can direct a chuck of a machine holding the workpiece to open at step 1210, releasing the workpiece and allowing the gripper to move the workpiece at step 1212. At step 1212, motors powering movement of the gripper can also flip the workpiece and reinsert the workpiece into the chuck (in the opposite direction).

Once the workpiece is inserted into the chuck, the controller can direct the chuck to close around the workpiece at step 1214, securing the workpiece within the chuck and therefore within or to the machine. Once the chuck is closed, the controller can enable the pump, allowing the fingers of the gripper to open at step 1216, releasing the workpiece from the gripper. The controller can then direct the motors to move the gripper away from the workpiece at step 1218 and can disable the pump at step 1220 to allow the gripper fingers to close.

If so desired, the controller can direct the motors to move the gripper to position a plunger of the gripper at the workpiece at step 1222. The motors can be further directed to move to apply a pressure from the plunger on the workpiece. As pressure is being applied, the controller can direct the machine to open the chuck at step 1224, allowing the plunger to push the workpiece further into the chuck, if necessary, fully seating an outer rim of the workpiece against a radially outer face of the chuck. Once the workpiece is fully seated within the chuck, the chuck can be closed at step 1226 via instruction from the controller, which can also direct the motors to move the gripper clear of the machine and the workpiece at step 1228.

ADDITIONAL NOTES

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above detailed description, various features can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the detailed description as examples or embodiments, with each claim standing on its own as a separate example, and it is contemplated that such examples can be combined with each other in various combinations or permutations. The scope of the invention should be determined with reference to the appended claims, along with the full scope of equivalents to which such claims are entitled.

The invention claimed is:

1. A fluid powered gripper comprising:
    a body comprising a central bore coaxial with a central longitudinal axis of the body;
    a bore fluid inlet fluidly coupleable to the central bore;
    a first finger rotatable about the body;
    a second finger opposing the first finger, the second finger rotatable about the body;
    a piston disposed in the central bore, the piston powered by a fluid to move between a first position and a second position, wherein the first finger and the second finger are closed in the first position and open in the second position;
    a plunger coupleable to the body and configured to extend from the body transverse to the central longitudinal axis; and
    a plunger biasing element engaging a plunger shaft to bias the plunger shaft in an extended position.

2. The fluid powered gripper of claim 1, further comprising:
    a biasing element engaging the piston and the body, the biasing element biasing the piston to the first position.

3. The fluid powered gripper of claim 2, further comprising:
    a first arm securable to the first finger and pivotably coupleable to the body; and
    a second arm securable to the second finger and pivotably coupleable to the body.

4. The fluid powered gripper of claim 3, further comprising:
    an actuator coupleable to a distal termination of the piston, the actuator coupleable to the first arm and the second arm, the actuator movable with the piston to actuate the first arm and the second arm between open and closed positions.

5. The fluid powered gripper of claim 3, wherein:
    the actuator further comprises a first notch and a second notch;
    the first arm further comprises a first drive pin extending from a proximal portion of the first arm to engage the first notch; and
    the second arm further comprises a second drive pin extending from a proximal portion of the second arm to engage the second notch.

6. The fluid powered gripper of claim 1, the plunger further comprising:
    a plunger housing coupleable to the body, the plunger shaft coupleable to the housing and configured to extend from the body transverse to the central longitudinal axis; and the plunger biasing element engaging the plunger housing to bias the plunger shaft in an extended position.

7. The fluid powered gripper of claim 1, further comprising:
    a tool holder comprising:
    a tool holder body;
    a tool central bore configured to receive a proximal portion of the fluid powered gripper therein, the tool central bore coaxial with and fluidly coupleable to the central bore of the fluid powered gripper;
    a tool holder fluid inlet proximate a proximal portion of the tool holder and fluidly coupleable to the tool central bore; and
    a fluid relief port fluidly coupleable to the tool central bore.

8. The fluid powered gripper of claim 7; wherein the fluid relief port is threaded to receive a set screw, the set screw including a set screw diameter configured to relieve a predetermined fluid flow rate to control a pressure applied to the piston when the tool holder fluid inlet receives the fluid.

9. A fluid powered gripper comprising:
    a body comprising a central bore coaxial with a central longitudinal axis of the body;
    a bore fluid inlet fluidly coupled to the central bore;
    a first arm securable to a first finger and pivotably coupled to the body, the first arm including a first drive pin extending from a proximal portion of the first arm;
    a second arm securable to a second finger and pivotably coupled to the body, the second arm including a second drive pin extending from a proximal portion of the second arm;
    a piston disposed in the central bore, the piston powered by a fluid to move between a first position and a second position, wherein the first finger and the second finger are closed in the first position and open in the second position; and
    an actuator coupled to a distal termination of the piston and movable with the piston to actuate the first arm and the second arm between open and closed positions, the actuator comprising:
    a first notch configured to receive the first drive pin to couple the first arm to the actuator; and
    a second notch configured to receive the second drive pin to couple the second arm to the actuator; and
    a plunger coupled to the body and extending from the body transverse to the central longitudinal axis and configured to act as a sprung rod when engaging a workpiece.

10. The fluid powered gripper of claim 9, the plunger further comprising:
    a plunger housing coupled to the body;
    a plunger shaft coupled to the housing and extending from the body transverse to the central longitudinal axis; and
    a plunger biasing element engaged with the plunger shaft and the plunger housing to bias the plunger shaft in an extended position.

* * * * *

UNITED STATES PATENT AND TRADEMARK OFFICE
CERTIFICATE OF CORRECTION

PATENT NO. : 10,807,250 B2
APPLICATION NO. : 15/479921
DATED : October 20, 2020
INVENTOR(S) : Chalk et al.

Page 1 of 1

It is certified that error appears in the above-identified patent and that said Letters Patent is hereby corrected as shown below:

In the Claims

In Column 16, Line 9, in Claim 6, delete "axis;" and insert --axis,-- therefor

In Column 16, Line 25, in Claim 8, delete "claim 7;" and insert --claim 7,-- therefor Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*